(12) United States Patent
Shabtay et al.

(10) Patent No.: US 10,015,408 B2
(45) Date of Patent: Jul. 3, 2018

(54) DUAL APERTURE ZOOM DIGITAL CAMERA

(71) Applicant: Corephotonics Ltd., Tel-Aviv (IL)

(72) Inventors: Gal Shabtay, Tel Aviv (IL); Ephraim Goldenberg, Ashdod (IL); Oded Gigushinski, Herzlia (IL); Noy Cohen, Tel-Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 15/424,853

(22) Filed: Feb. 5, 2017

(65) Prior Publication Data

US 2017/0150061 A1     May 25, 2017

Related U.S. Application Data

(63) Continuation of application No. 14/880,251, filed on Oct. 11, 2015, which is a continuation of application
(Continued)

(51) Int. Cl.
*H04N 5/232*     (2006.01)
*H04N 5/225*     (2006.01)
(Continued)

(52) U.S. Cl.
CPC ..... *H04N 5/23296* (2013.01); *G02B 13/0015* (2013.01); *G02B 27/0075* (2013.01); *H04N 5/2258* (2013.01); *H04N 5/23212* (2013.01)

(58) Field of Classification Search
CPC .................. H04N 5/23296; G02B 13/0015
See application file for complete search history.

(56) References Cited

U.S. PATENT DOCUMENTS 9,405,099 B2 *   8/2016   Jo ....................... G02B 13/0045
9,576,369 B2 *   2/2017   Venkataraman .. H01L 27/14618
(Continued)

FOREIGN PATENT DOCUMENTS

JP     2013106289 A *   5/2013     .......... H04N 5/2258
JP     5741395     7/2015

OTHER PUBLICATIONS

JP 2013106289 A; May 2013; Machine English Translation; Japan Platform Patent Information; pp. 1-18.*
(Continued)

*Primary Examiner* — Cynthia Segura
(74) *Attorney, Agent, or Firm* — Nathan & Associates Patent Agents Ltd.; Menachem Nathan

(57) ABSTRACT

A dual-aperture zoom digital camera operable in both still and video modes. The camera includes Wide and Tele imaging sections with respective lens/sensor combinations and image signal processors and a camera controller operatively coupled to the Wide and Tele imaging sections. The Wide and Tele imaging sections provide respective image data. The controller is configured to combine in still mode at least some of the Wide and Tele image data to provide a fused output image from a particular point of view, and to provide without fusion continuous zoom video mode output images, each output image having a given output resolution, wherein the video mode output images are provided with a smooth transition when switching between a lower zoom factor (ZF) value and a higher ZF value or vice versa, and wherein at the lower ZF the output resolution is determined by the Wide sensor while at the higher ZF value the output resolution is determined by the Tele sensor.

7 Claims, 8 Drawing Sheets

Related U.S. Application Data

No. 14/365,711, filed as application No. PCT/IB2014/062180 on Jun. 12, 2014, now Pat. No. 9,185,291.

(60) Provisional application No. 61/834,486, filed on Jun. 13, 2013.

(51) Int. Cl.
*G02B 13/00* (2006.01)
*G02B 27/00* (2006.01)

(56) References Cited

U.S. PATENT DOCUMENTS

| | | | |
|---|---|---|---|
| 9,633,442 B2* | 4/2017 | Venkataraman | G06T 7/593 |
| 2006/0187312 A1 | 8/2006 | Labaziewicz et al. | |
| 2007/0229697 A1* | 10/2007 | Choi | H04N 5/2257 |
| | | | 348/345 |
| 2008/0030592 A1* | 2/2008 | Border | H04N 5/232 |
| | | | 348/218.1 |
| 2008/0187310 A1 | 8/2008 | Tanaka | |
| 2008/0218613 A1 | 9/2008 | Jenson et al. | |
| 2009/0002839 A1 | 1/2009 | Sato | |
| 2010/0277269 A1 | 11/2010 | Scarff | |
| 2011/0080487 A1 | 4/2011 | Venkataraman et al. | |
| 2011/0129210 A1* | 6/2011 | McGucken | F16M 13/02 |
| | | | 396/422 |
| 2012/0074227 A1* | 3/2012 | Ferren | G02B 13/0065 |
| | | | 235/462.21 |
| 2012/0206458 A1* | 8/2012 | El Dokor | G06F 3/0421 |
| | | | 345/423 |
| 2012/0314296 A1* | 12/2012 | Shabtay | G02B 13/18 |
| | | | 359/662 |
| 2013/0182335 A1* | 7/2013 | Tsai | G02B 13/0045 |
| | | | 359/714 |
| 2013/0215289 A1* | 8/2013 | Vitsnudel | H04N 5/232 |
| | | | 348/231.99 |
| 2013/0335833 A1* | 12/2013 | Liao | G02B 13/0045 |
| | | | 359/713 |
| 2014/0009585 A1* | 1/2014 | Campbell | H04N 13/0203 |
| | | | 348/47 |
| 2015/0009395 A1* | 1/2015 | Ono | H04N 5/2254 |
| | | | 348/360 |
| 2015/0161798 A1* | 6/2015 | Venkataraman | G01P 3/38 |
| | | | 348/47 |
| 2015/0198784 A1* | 7/2015 | Bone | G02B 13/004 |
| | | | 359/708 |
| 2017/0102513 A1* | 4/2017 | Ogata | G02B 7/021 |
| 2017/0249053 A1* | 8/2017 | El Dokor | G06F 3/0421 |
| 2017/0276911 A1* | 9/2017 | Huang | G02B 13/0045 |

OTHER PUBLICATIONS

European Supplementary Search report in related EP patent application 14810366.6, dated Apr. 6, 2016, 4 pages.

* cited by examiner

DUAL APERTURE ZOOM DIGITAL CAMERA

CROSS REFERENCE TO RELATED APPLICATIONS

This application is a Continuation application of U.S. patent application Ser. No. 14/880,251 filed Oct. 11, 2015 (now allowed), which was a Continuation application of U.S. patent application Ser. No. 14/365,711 filed Jun. 16, 2014 (issued as U.S. Pat. No. 9,185,291), which was a 371 application from international patent application PCT/IB2014/062180 filed Jun. 12, 2014, and is related to and claims priority from U.S. Provisional Patent Application No. 61/834,486 having the same title and filed Jun. 13, 2013, which is incorporated herein by reference in its entirety.

FIELD

Embodiments disclosed herein relate in general to digital cameras and in particular to thin zoom digital cameras with both still image and video capabilities

BACKGROUND

Digital camera modules are currently being incorporated into a variety of host devices. Such host devices include cellular telephones, personal data assistants (PDAs), computers, and so forth. Consumer demand for digital camera modules in host devices continues to grow.

Host device manufacturers prefer digital camera modules to be small, so that they can be incorporated into the host device without increasing its overall size. Further, there is an increasing demand for such cameras to have higher-performance characteristics. One such characteristic possessed by many higher-performance cameras (e.g., standalone digital still cameras) is the ability to vary the focal length of the camera to increase and decrease the magnification of the image. This ability, typically accomplished with a zoom lens, is known as optical zooming. "Zoom" is commonly understood as a capability to provide different magnifications of the same scene and/or object by changing the focal length of an optical system, with a higher level of zoom associated with greater magnification and a lower level of zoom associated with lower magnification. Optical zooming is typically accomplished by mechanically moving lens elements relative to each other. Such zoom lenses are typically more expensive, larger and less reliable than fixed focal length lenses. An alternative approach for approximating the zoom effect is achieved with what is known as digital zooming. With digital zooming, instead of varying the focal length of the lens, a processor in the camera crops the image and interpolates between the pixels of the captured image to create a magnified but lower-resolution image.

Attempts to use multi-aperture imaging systems to approximate the effect of a zoom lens are known. A multi-aperture imaging system (implemented for example in a digital camera) includes a plurality of optical sub-systems (also referred to as "sub-cameras"). Each sub-camera includes one or more lenses and/or other optical elements which define an aperture such that received electro-magnetic radiation is imaged by the optical sub-system and a resulting image is directed towards a two-dimensional (2D) pixelated image sensor region. The image sensor (or simply "sensor") region is configured to receive the image and to generate a set of image data based on the image. The digital camera may be aligned to receive electromagnetic radiation associated with scenery having a given set of one or more objects. The set of image data may be represented as digital image data, as well known in the art. Hereinafter in this description, "image" "image data" and "digital image data" may be used interchangeably. Also, "object" and "scene" may be used interchangeably.

Multi-aperture imaging systems and associated methods are described for example in US Patent Publications No. 2008/0030592, 2010/0277619 and 2011/0064327. In US 2008/0030592, two sensors are operated simultaneously to capture an image imaged through an associated lens. A sensor and its associated lens form a lens/sensor combination. The two lenses have different focal lengths. Thus, even though each lens/sensor combination is aligned to look in the same direction, each captures an image of the same subject but with two different fields of view (FOVs). One sensor is commonly called "Wide" and the other "Tele". Each sensor provides a separate image, referred to respectively as "Wide" (or "W") and "Tele" (or "T") images. A W-image reflects a wider FOV and has lower resolution than the T-image. The images are then stitched (fused) together to form a composite ("fused") image. In the composite image, the central portion is formed by the relatively higher-resolution image taken by the lens/sensor combination with the longer focal length, and the peripheral portion is formed by a peripheral portion of the relatively lower-resolution image taken by the lens/sensor combination with the shorter focal length. The user selects a desired amount of zoom and the composite image is used to interpolate values from the chosen amount of zoom to provide a respective zoom image. The solution offered by US 2008/0030592 requires, in video mode, very large processing resources in addition to high frame rate requirements and high power consumption (since both cameras are fully operational).

US 2010/0277619 teaches a camera with two lens/sensor combinations, the two lenses having different focal lengths, so that the image from one of the combinations has a FOV approximately 2-3 times greater than the image from the other combination. As a user of the camera requests a given amount of zoom, the zoomed image is provided from the lens/sensor combination having a FOV that is next larger than the requested FOV. Thus, if the requested FOV is less than the smaller FOV combination, the zoomed image is created from the image captured by that combination, using cropping and interpolation if necessary. Similarly, if the requested FOV is greater than the smaller FOV combination, the zoomed image is created from the image captured by the other combination, using cropping and interpolation if necessary. The solution offered by US 2010/0277619 leads to parallax artifacts when moving to the Tele camera in video mode.

In both US 2008/0030592 and US 2010/0277619, different focal length systems cause Tele and Wide matching FOVs to be exposed at different times using CMOS sensors. This degrades the overall image quality. Different optical F numbers ("F#") cause image intensity differences. Working with such a dual sensor system requires double bandwidth support, i.e. additional wires from the sensors to the following HW component. Neither US 2008/0030592 nor US 2010/0277619 deal with registration errors. Neither US2008/000592 nor US 2010/0277619 refer to partial fusion, i.e. fusion of less than all the pixels of both Wide and Tele images in still mode.

US 2011/0064327 discloses multi-aperture imaging systems and methods for image data fusion that include providing first and second sets of image data corresponding to an imaged first and second scene respectively. The scenes overlap at least partially in an overlap region, defining a first collection of overlap image data as part of the first set of image data, and a second collection of overlap image data as part of the second set of image data. The second collection of overlap image data is represented as a plurality of image data sub-cameras such that each of the sub-cameras is based on at least one characteristic of the second collection, and each sub-camera spans the overlap region. A fused set of image data is produced by an image processor, by modifying the first collection of overlap image data based on at least a selected one of, but less than all of, the image data sub-cameras. The systems and methods disclosed in this application deal solely with fused still images.

None of the known art references provide a thin (e.g. fitting in a cell-phone) dual-aperture zoom digital camera with fixed focal length lenses, the camera configured to operate in both still mode and video mode to provide still and video images, wherein the camera configuration uses partial or full fusion to provide a fused image in still mode and does not use any fusion to provide a continuous, smooth zoom in video mode.

Therefore there is a need for, and it would be advantageous to have thin digital cameras with optical zoom operating in both video and still mode that do not suffer from commonly encountered problems and disadvantages, some of which are listed above.

SUMMARY

Embodiments disclosed herein teach the use of dual-aperture (also referred to as dual-lens or two-sensor) optical zoom digital cameras. The cameras include two sub-cameras, a Wide sub-camera and a Tele sub-camera, each sub-camera including a fixed focal length lens, an image sensor and an image signal processor (ISP). The Tele sub-camera is the higher zoom sub-camera and the Wide sub-camera is the lower zoom sub-camera. In some embodiments, the lenses are thin lenses with short optical paths of less than about 9 mm. In some embodiments, the thickness/effective focal length (EFL) ratio of the Tele lens is smaller than about 1. The image sensor may include two separate 2D pixelated sensors or a single pixelated sensor divided into at least two areas. The digital camera can be operated in both still and video modes. In still mode, zoom is achieved "with fusion" (full or partial), by fusing W and T images, with the resulting fused image including always information from both W and T images. Partial fusion may be achieved by not using fusion in image areas where the Tele image is not focused. This advantageously reduces computational requirements (e.g. time).

In video mode, optical zoom is achieved "without fusion", by switching between the W and T images to shorten computational time requirements, thus enabling high video rate. To avoid discontinuities in video mode, the switching includes applying additional processing blocks, which include image scaling and shifting.

In order to reach optical zoom capabilities, a different magnification image of the same scene is captured (grabbed) by each camera sub-camera, resulting in FOV overlap between the two sub-cameras. Processing is applied on the two images to fuse and output one fused image in still mode. The fused image is processed according to a user zoom factor request. As part of the fusion procedure, up-sampling may be applied on one or both of the grabbed images to scale it to the image grabbed by the Tele sub-camera or to a scale defined by the user. The fusion or up-sampling may be applied to only some of the pixels of a sensor. Down-sampling can be performed as well if the output resolution is smaller than the sensor resolution.

The cameras and associated methods disclosed herein address and correct many of the problems and disadvantages of known dual-aperture optical zoom digital cameras. They provide an overall zoom solution that refers to all aspects: optics, algorithmic processing and system hardware (HW). The proposed solution distinguishes between video and still mode in the processing flow and specifies the optical requirements and HW requirements. In addition, it provides an innovative optical design that enables a low TTL/EFL ratio using a specific lens curvature order.

Due to the large focal length, objects that are in front or behind the plane of focus appear very blurry, and a nice foreground-to-background contrast is achieved. However, it is difficult to create such a blur using a compact camera with a relatively short focal length and small aperture size, such as a cell-phone camera. In some embodiments, a dual-aperture zoom system disclosed herein can be used to capture a shallow DOF photo (shallow compared with a DOF of a Wide camera alone), by taking advantage of the longer focal length of the Tele lens. The reduced DOF effect provided by the longer Tele focal length can be further enhanced in the final image by fusing data from an image captured simultaneously with the Wide lens. Depending on the distance to the object, with the Tele lens focused on a subject of the photo, the Wide lens can be focused to a closer distance than the subject so that objects behind the subject appear very blurry. Once the two images are captured, information from the out-of-focus blurred background in the Wide image is fused with the original Tele image background information, providing a blurrier background and even shallower DOF.

In an embodiment there is provided a zoom digital camera comprising a Wide imaging section that includes a fixed focal length Wide lens with a Wide FOV, a Wide sensor and a Wide image signal processor (ISP), the Wide imaging section operative to provide Wide image data of an object or scene; a Tele imaging section that includes a fixed focal length Tele lens with a Tele FOV that is narrower than the Wide FOV, a Tele sensor and a Tele ISP, the Tele imaging section operative to provide Tele image data of the object or scene; and a camera controller operatively coupled to the Wide and Tele imaging sections, the camera controller configured to combine in still mode at least some of the Wide and Tele image data to provide a fused output image of the object or scene from a particular point of view (POV), and to provide without fusion continuous zoom video mode output images of the object or scene, a camera controller operatively coupled to the Wide and Tele imaging sections, the camera controller configured to combine in still mode at least some of the Wide and Tele image data to provide a fused output image of the object or scene from a particular point of view and to provide without fusion continuous zoom video mode output images of the object or scene, each output image having a respective output resolution, wherein the video output images are provided with a smooth transition when switching between a lower zoom factor (ZF) value and a higher ZF value or vice versa, wherein at the lower ZF value the output resolution is determined by the Wide sensor, and wherein at the higher ZF value the output resolution is determined by the Tele sensor.

In an embodiment, the camera controller configuration to provide video output images with a smooth transition when switching between a lower ZF value and a higher ZF value or vice versa includes a configuration that uses at high ZF secondary information from the Wide camera and uses at low ZF secondary information from the Tele camera. As used herein, "secondary information" refers to white balance gain, exposure time, analog gain and color correction matrix.

In a dual-aperture camera image plane, as seen by each sub-camera (and respective image sensor), a given object will be shifted and have different perspective (shape). This is referred to as point-of-view (POV). The system output image can have the shape and position of either sub-camera image or the shape or position of a combination thereof. If the output image retains the Wide image shape then it has the Wide perspective POV. If it retains the Wide camera position then it has the Wide position POV. The same applies for Tele images position and perspective. As used in this description, the perspective POV may be of the Wide or Tele sub-cameras, while the position POV may shift continuously between the Wide and Tele sub-cameras. In fused images, it is possible to register Tele image pixels to a matching pixel set within the Wide image pixels, in which case the output image will retain the Wide POV ("Wide fusion"). Alternatively, it is possible to register Wide image pixels to a matching pixel set within the Tele image pixels, in which case the output image will retain the Tele POV ("Tele fusion"). It is also possible to perform the registration after either sub-camera image is shifted, in which case the output image will retain the respective Wide or Tele perspective POV.

In an embodiment there is provided a method for obtaining zoom images of an object or scene in both still and video modes using a digital camera, the method comprising the steps of providing in the digital camera a Wide imaging section having a Wide lens with a Wide FOV, a Wide sensor and a Wide image signal processor (ISP), a Tele imaging section having a Tele lens with a Tele FOV that is narrower than the Wide FOV, a Tele sensor and a Tele ISP, and a camera controller operatively coupled to the Wide and Tele imaging sections; and configuring the camera controller to combine in still mode at least some of the Wide and Tele image data to provide a fused output image of the object or scene from a particular point of view, and to provide without fusion continuous zoom video mode output images of the object or scene, each output image having a respective output resolution, wherein the video mode output images are provided with a smooth transition when switching between a lower ZF value and a higher ZF value or vice versa, and wherein at the lower ZF value the output resolution is determined by the Wide sensor while at the higher ZF value the output resolution is determined by the Tele sensor.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way.

DETAILED DESCRIPTION

Figure 1A:
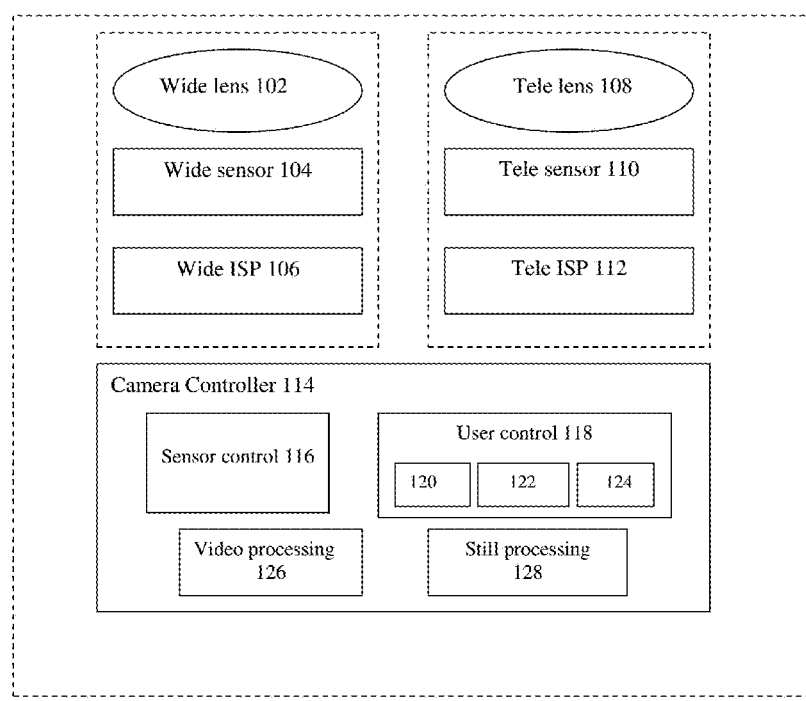
FIG. 1A shows schematically a block diagram illustrating a dual-aperture zoom imaging system disclosed herein.

FIG. 1A shows schematically a block diagram illustrating an embodiment of a dual-aperture zoom imaging system (also referred to simply as "digital camera" or "camera") disclosed herein and numbered 100. Camera 100 comprises a Wide imaging section ("sub-camera") that includes a Wide lens block 102, a Wide image sensor 104 and a Wide image processor 106. Camera 100 further comprises a Tele imaging section ("sub-camera") that includes a Tele lens block 108, a Tele image sensor 110 and a Tele image processor 112. The image sensors may be physically separate or may be part of a single larger image sensor. The Wide sensor pixel size can be equal to or different from the Tele sensor pixel size. Camera 100 further comprises a camera fusion processing core (also referred to as "controller") 114 that includes a sensor control module 116, a user control module 118, a video processing module 126 and a capture processing module 128, all operationally coupled to sensor control block 110. User control module 118 comprises an operational mode function 120, a region of interest (ROI) function 122 and a zoom factor (ZF) function 124.

Sensor control module 116 is connected to the two sub-cameras and to the user control module 118 and used to choose, according to the zoom factor, which of the sensors is operational and to control the exposure mechanism and the sensor readout. Mode choice function 120 is used for choosing capture/video modes. ROI function 122 is used to choose a region of interest. As used herein, "ROI" is a user defined as a sub-region of the image that may be exemplarily 4% or less of the image area. The ROI is the region on which both sub-cameras are focused on. Zoom factor function 124 is used to choose a zoom factor. Video processing module 126 is connected to mode choice function 120 and used for video processing. Still processing module 128 is connected to the mode choice function 120 and used for high image quality still mode images. The video processing module is applied when the user desires to shoot in video mode. The capture processing module is applied when the user wishes to shoot still pictures.

Figure 1B:
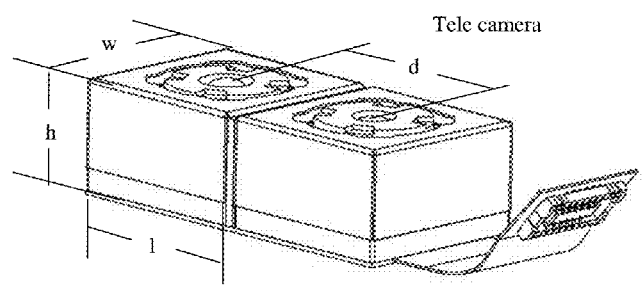
FIG. 1B is a schematic mechanical diagram of the dual-aperture zoom imaging system of FIG. 1A.

FIG. 1B is a schematic mechanical diagram of the dual-aperture zoom imaging system of FIG. 1A. Exemplary dimensions: Wide lens TTL=4.2 mm and EFL=3.5 mm; Tele lens TTL=6 mm and EFL=7 mm; both Wide and Tele sensors ⅓ inch. External dimensions of Wide and Tele cameras: width (w) and length (l)=8.5 mm and height (h)=6.8 mm. Distance "d" between camera centers=10 mm.

Following is a detailed description and examples of different methods of use of camera 100.

Design for Continuous and Smooth Zoom in Video Mode

In an embodiment, in order to reach high quality continuous and smooth optical zooming in video camera mode while reaching real optical zoom using fixed focal length sub-cameras, the system is designed according to the following rules (Equations 1-3):

$$\text{Tan}(FOV_{Wide})/\text{Tan}(FOV_{Tele}) = PL_{Wide}/PL_{video} \quad (1)$$

where Tan refers to "tangent", while $FOV_{Wide}$ and $FOV_{Tele}$ refer respectively to the Wide and Tele lens fields of view (in degrees). As used herein, the FOV is measured from the center axis to the corner of the sensor (i.e. half the angle of the normal definition). $PL_{Wide}$ and $PL_{video}$ refer respectively to the "in-line" (i.e. in a line) number of Wide sensor pixels and in-line number of output video format pixels. The ratio $PL_{Wide}/PL_{video}$ is called an "oversampling ratio". For example, in order to get full and continuous optical zoom experience with a 12 Mp sensor (sensor dimensions 4000×3000) and a required 1080 p (dimension 1920×1080) video format, the FOV ratio should be 4000/1920=2.083. Moreover, if the Wide lens FOV is given as $FOV_{Wide}=37.5°$, the required Tele lens FOV is 20.2° The zoom switching point is set according to the ratio between sensor pixels in-line and the number of pixels in-line in the video format and defined as:

$$Z_{switch} = PL_{Wide}/PL_{video} \quad (2)$$

Maximum optical zoom is reached according to the following formula:

$$Z_{max} = \text{Tan}(FOV_{Wide})/\text{Tan}(FOV_{Tele}) * PL_{Tele}/PL_{video} \quad (3)$$

For example: for the configuration defined above and assuming $PL_{Tele}=4000$ and $PL_{video}=1920$, $Z_{max}=4.35$.

In an embodiment, the sensor control module has a setting that depends on the Wide and Tele FOVs and on a sensor oversampling ratio, the setting used in the configuration of each sensor. For example, when using a 4000×3000 sensor and when outputting a 1920×1080 image, the oversampling ratio is 4000/1920=2.0833.

In an embodiment, the Wide and Tele FOVs and the oversampling ratio satisfy the condition $$0.8*PL_{Wide}/PL_{video} < \text{Tan}(FOV_{Wide})/\text{Tan}(FOV_{Tele}) < 1.2*PL_{Wide}/PL_{video}. \quad (4)$$

Still Mode Operation/Function

Figure 2:
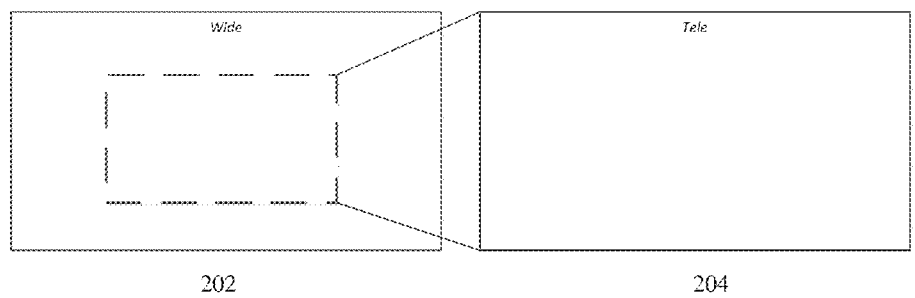
FIG. 2 shows an example of Wide sensor, Tele sensor and their respective FOVs.

In still camera mode, the obtained image is fused from information obtained by both sub-cameras at all zoom levels, see FIG. 2, which shows a Wide sensor 202 and a Tele sensor 204 and their respective FOVs. Exemplarily, as shown, the Tele sensor FOV is half the Wide sensor FOV. The still camera mode processing includes two stages: (1) setting HW settings and configuration, where a first objective is to control the sensors in such a way that matching FOVs in both images (Tele and Wide) are scanned at the same time. A second objective is to control the relative exposures according to the lens properties. A third objective is to minimize the required bandwidth from both sensors for the ISPs; and (2) image processing that fuses the Wide and the Tele images to achieve optical zoom, improves SNR and provides wide dynamic range.

Figure 3:
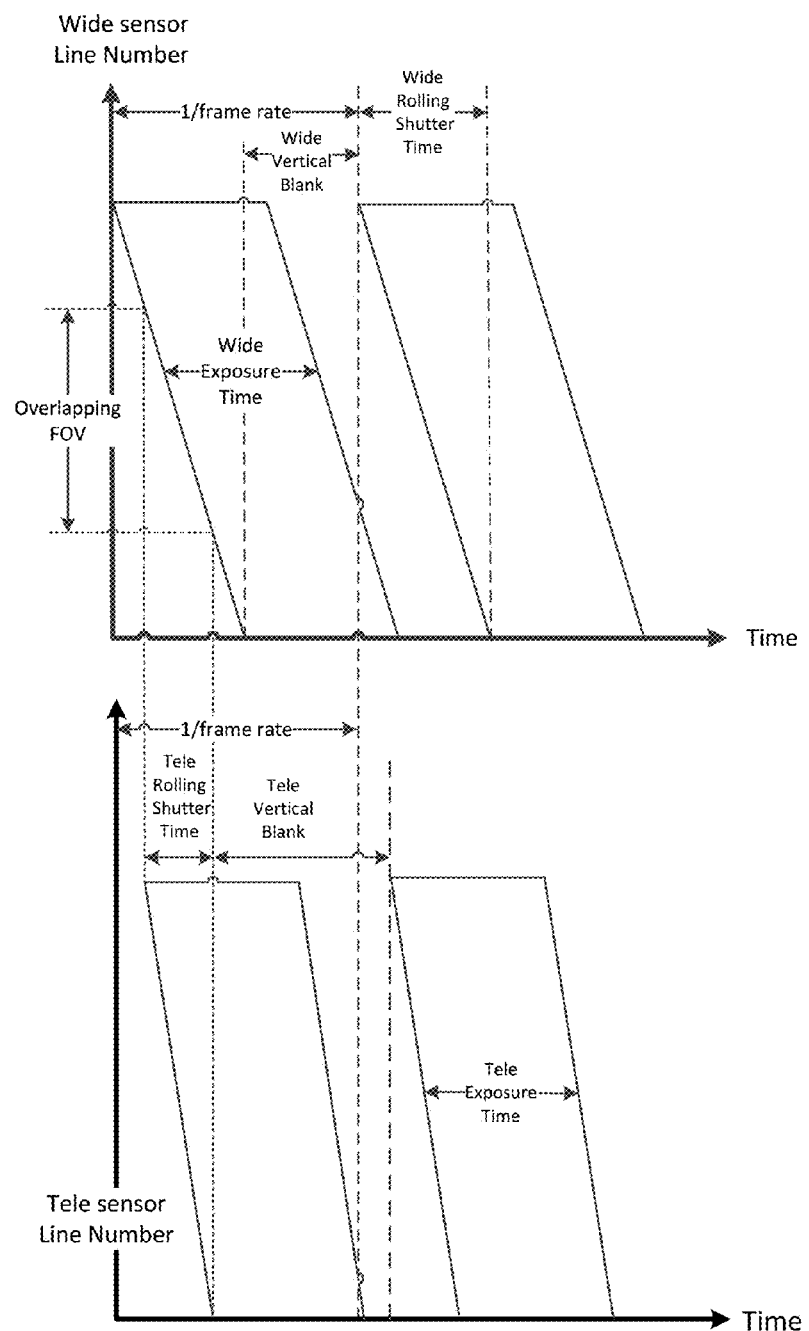
FIG. 3 shows a schematically embodiment of CMOS sensor image grabbing vs. time.

FIG. 3 shows image line numbers vs. time for an image section captured by CMOS sensors. A fused image is obtained by line (row) scans of each image. To prevent matching FOVs in both sensors to be scanned at different times, a particular configuration is applied by the camera controller on both image sensors while keeping the same frame rate. The difference in FOV between the sensors determines the relationship between the rolling shutter time and the vertical blanking time for each sensor. In the particular configuration, the scanning is synchronized such that the same points of the object in each view are obtained simultaneously.

Specifically with reference to FIG. 3 and according to an embodiment of a method disclosed herein, the configuration to synchronize the scanning includes: setting the Tele sensor vertical blanking time $VB_{Tele}$ to equal the Wide sensor vertical blanking time $VB_{Wide}$ plus half the Wide sensor rolling shutter time $RST_{Wide}$; setting the Tele and Wide sensor exposure times $ET_{Tele}$ and $ET_{Wide}$ to be equal or different; setting the Tele sensor rolling shutter time $RST_{Tele}$ to be $0.5*RST_{Wide}$; and setting the frame rates of the two sensors to be equal. This procedure results in identical image pixels in the Tele and Wide sensor images being exposed at the same time In another embodiment, the camera controller synchronizes the Wide and Tele sensors so that for both sensors the rolling shutter starts at the same time.

The exposure times applied to the two sensors could be different, for example in order to reach same image intensity using different F# and different pixel size for the Tele and Wide systems. In this case, the relative exposure time may be configured according to the formula below:

$$ET_{Tele} = ET_{Wide} \cdot (F\#_{Tele}/F\#_{Wide})^2 \cdot (\text{Pixel size}_{Wide}/\text{Pixel size}_{Tele})^2 \quad (5)$$

Other exposure time ratios may be applied to achieve wide dynamic range and improved SNR. Fusing two images with different intensities will result in wide dynamic range image.

In more detail with reference to FIG. 3, in the first stage, after the user chooses a required zoom factor ZF, the sensor control module configures each sensor as follows:

1) Cropping index Wide sensor:

$$Y_{Wide\ start} = 1/2 \cdot PC_{Wide}(1-1/ZF)$$

$$Y_{Wide\ end} = 1/2 \cdot PC_{Wide}(1+1/ZF)$$

where PC is the number of pixels in a column, and Y is the row number

2) Cropping index Tele sensor:

If $ZF > \text{Tan}(FOV_{Wide})/\text{Tan}(FOV_{Tele})$, then $$Y_{Tele\ start} = 1/2 \cdot PC_{Tele}(1-(1/ZF) \cdot \text{Tan}(FOV_{Tele})/\text{Tan}(FOV_{Wide}))$$

$$Y_{Tele\ end} = 1/2 \cdot PC_{Tele}(1+(1/ZF) \cdot \text{Tan}(FOV_{Tele})/\text{Tan}(FOV_{Wide}))$$

If $ZF < \text{Tan}(FOV_{Wide})/\text{Tan}(FOV_{Tele})$, then $$Y_{Tele\ start} = 0$$

$$Y_{Tele\ end} = PC_{Tele}$$

This will result in an exposure start time of the Tele sensor with a delay of (in numbers of lines, relative to the Wide sensor start time):

$$(1-ZF/((\text{Tan}(FOV_{Wide})/\text{Tan}(FOV_{Tele}))) \cdot 1/(2 \cdot FPS) \quad (6)$$

where FPS is the sensor's frame per second configuration. In cases where $ZF > \text{Tan}(FOV_{Wide})/\text{Tan}(FOV_{Tele})$, no delay will be introduced between Tele and Wide exposure starting point. For example, for a case where $\text{Tan}(FOV_{Wide})/\text{Tan}(FOV_{Tele})=2$ and $ZF=1$, the Tele image first pixel is exposed $1/4 \cdot (1/FPS)$ second after the Wide image first pixel was exposed.

After applying the cropping according to the required zoom factor, the sensor rolling shutter time and the vertical blank should be configured in order to satisfy the equation to keep the same frame rate:

$$VB_{Wide} + RST_{Wide} = VB_{Tele} + RST_{Tele} \quad (7)$$

FIG. 3 exemplifies Eq. (7), One way to satisfy Eq. (7) is to increase the $RST_{Wide}$. Controlling the $RST_{Wide}$ may be done by changing the horizontal blanking (HB) of the Wide sensor. This will cause a delay between the data coming out from each row of the Wide sensor.

Generally, working with a dual-sensor system requires multiplying the bandwidth to the following block, for example the ISP. For example, using 12 Mp working at 30 fps, 10 bit per pixel requires working at 3.6 Gbit/sec. In this example, supporting this bandwidth requires 4 lanes from each sensor to the respective following ISP in the processing chain. Therefore, working with two sensors requires double bandwidth (7.2 Gbit/sec) and 8 lanes connected to the respective following blocks. The bandwidth can be reduced by configuring and synchronizing the two sensors. Consequently, the number of lanes can be half that of a conventional configuration (3.6 Gbit/sec).

Figure 4:
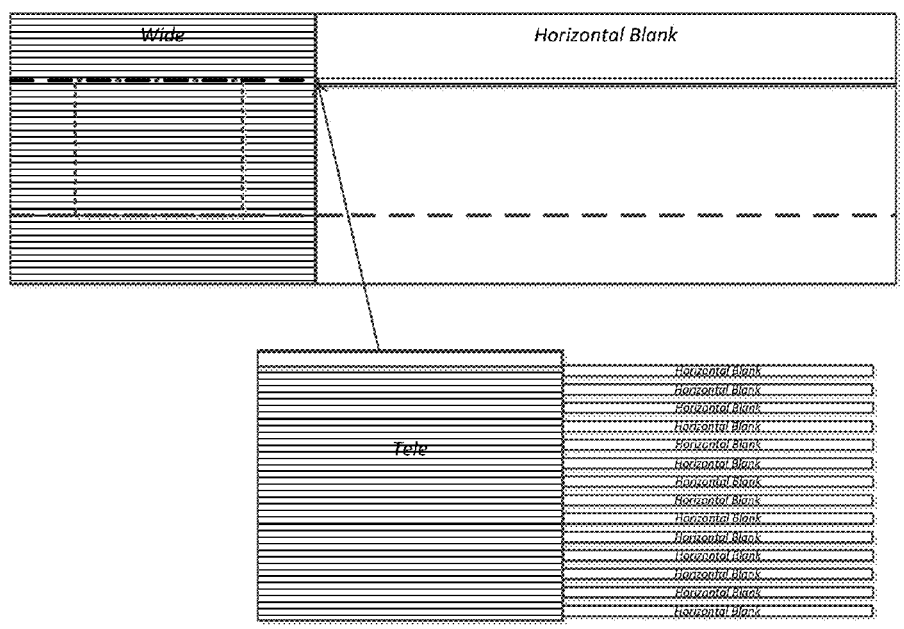
FIG. 4 shows schematically a sensor time configuration which enables sharing one sensor interface using dual sensor zoom system.

FIG. 4 shows schematically a sensor time configuration that enables sharing one sensor interface using a dual-sensor zoom system, while fulfilling the conditions in the description of FIG. 3 above. For simplicity, assuming the Tele sensor image is magnified by a factor of 2 compared with the Wide sensor image, the Wide sensor horizontal blanking time $HB_{Wide}$ is set to twice the Wide sensor line readout time. This causes a delay between output Wide lines. This delay time matches exactly the time needed to output two lines from the Tele sensor. After outputting two lines from the Tele sensor, the Tele sensor horizontal blanking time $HB_{Tele}$ is set to be one Wide line readout time, so, while the Wide sensor outputs a row from the sensor, no data is being output from the Tele sensor. For this example, every $3^{rd}$ line in the Tele sensor is delayed by an additional $HB_{Tele}$. In this delay time, one line from the Wide sensor is output from the dual-sensor system. After the sensor configuration stage, the data is sent in parallel or by using multiplexing into the processing section.

Figure 5:
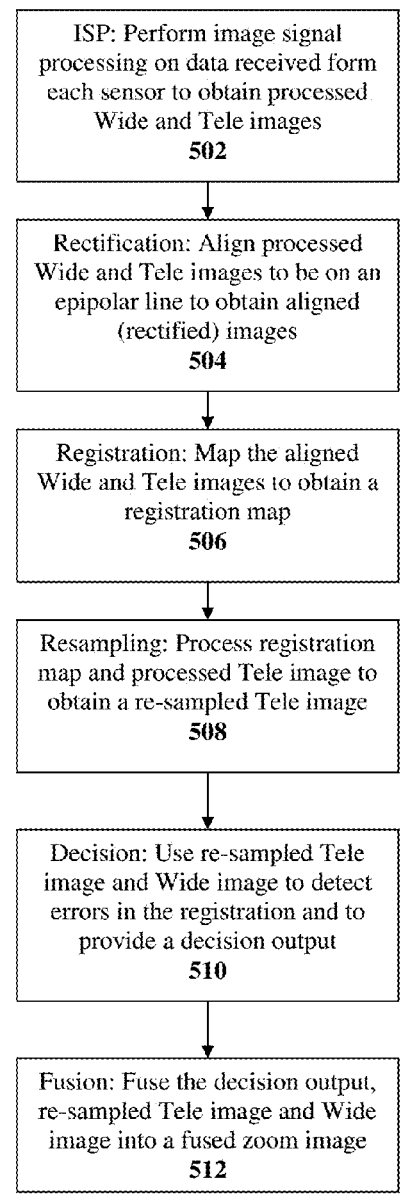
FIG. 5 shows an embodiment of a method disclosed herein for acquiring a zoom image in capture mode.

FIG. 5 shows an embodiment of a method disclosed herein for acquiring a zoom image in still mode. In ISP step 502, the data of each sensor is transferred to the respective ISP component, which performs on the data various processes such as denoising, demosaicing, sharpening, scaling, etc, as known in the art. After the processing in step 502, all following actions are performed in capture processing core 128: in rectification step 504, both Wide and Tele images are aligned to be on the epipolar line; in registration step 506, mapping between the Wide and the Tele aligned images is performed to produce a registration map; in resampling step 508, the Tele image is resampled according to the registration map, resulting in a re-sampled Tele image; in decision step 510, the re-sampled Tele image and the Wide image are processed to detect errors in the registration and to provide a decision output. In more detail, in step 510, the re-sampled Tele image data is compared with the Wide image data and if the comparison detects significant dissimilarities, an error is indicated. In this case, the Wide pixel values are chosen to be used in the output image. Then, in fusion step 512, the decision output, re-sampled Tele image and the Wide image are fused into a single zoom image.

To reduce processing time and power, steps 506, 508, 510, 512 could be bypassed by not fusing the images in non-focused areas. In this case, all steps specified above should be applied on focused areas only. Since the Tele optical system will introduce shallower depth of field than the Wide optical system, defocused areas will suffer from lower contrast in the Tele system.

Zoom-in and Zoom-Out in Still Camera Mode

We define the following: TFOV=tan (camera FOV/2). "Low ZF" refers to all ZF that comply with ZF<Wide TFOV/Tele TFOV. "High ZF" refers to all ZF that comply with ZF>Wide TFOV/Tele TFOV. "ZFT" refers to a ZF that complies with ZF=Wide TFOV/Tele TFOV. In one embodiment, zoom-in and zoom-out in still mode is performed as follows:

Zoom-in: at low ZF up to slightly above ZFT, the output image is a digitally zoomed, Wide fusion output. For the up-transfer ZF, the Tele image is shifted and corrected by global registration (GR) to achieve smooth transition. Then, the output is transformed to a Tele fusion output. For higher (than the up-transfer) ZF, the output is the Tele fusion output digitally zoomed.

Zoom-out: at high ZF down to slightly below ZFT, the output image is a digitally zoomed, Tele fusion output. For the down-transfer ZF, the Wide image is shifted and corrected by GR to achieve smooth transition. Then, the output is transformed to a Wide fusion output. For lower (than the down-transfer) ZF, the output is basically the down-transfer ZF output digitally zoomed but with gradually smaller Wide shift correction, until for ZF=1 the output is the unchanged Wide camera output.

In another embodiment, zoom-in and zoom-out in still mode is performed as follows:

Zoom-in: at low ZF up to slightly above ZFT, the output image is a digitally zoomed, Wide fusion output. For the up-transfer ZF and above, the output image is the Tele fusion output.

Zoom-out: at high ZF down to slightly below ZFT, the output image is a digitally zoomed, Tele fusion output. For the down-transfer ZF and below, the output image is the Wide fusion output.

Video Mode Operation/Function

Smooth Transition

When a dual-aperture camera switches the camera output between sub-cameras or points of view, a user will normally see a "jump" (discontinuous) image change. However, a change in the zoom factor for the same camera and POV is viewed as a continuous change. A "smooth transition" is a transition between cameras or POVs that minimizes the jump effect. This may include matching the position, scale, brightness and color of the output image before and after the transition. However, an entire image position matching between the sub-camera outputs is in many cases impossible, because parallax causes the position shift to be dependent on the object distance. Therefore, in a smooth transition as disclosed herein, the position matching is achieved only in the ROI region while scale brightness and color are matched for the entire output image area.

Zoom-In and Zoom-Out In Video Mode

In video mode, sensor oversampling is used to enable continuous and smooth zoom experience. Processing is applied to eliminate the changes in the image during crossover from one sub-camera to the other. Zoom from 1 to $Z_{switch}$ is performed using the Wide sensor only. From $Z_{switch}$ and on, it is performed mainly by the Tele sensor. To prevent "jumps" (roughness in the image), switching to the Tele image is done using a zoom factor which is a bit higher ($Z_{switch}+\Delta Zoom$) than $Z_{switch}$. $\Delta Zoom$ is determined according to the system's properties and is different for cases where zoom-in is applied and cases where zoom-out is applied ($\Delta Zoom_{in} \neq \Delta Zoom_{out}$). This is done to prevent residual jumps artifacts to be visible at a certain zoom factor. The switching between sensors, for an increasing zoom and for decreasing zoom, is done on a different zoom factor.

The zoom video mode operation includes two stages: (1) sensor control and configuration, and (2) image processing. In the range from 1 to $Z_{switch}$, only the Wide sensor is operational, hence, power can be supplied only to this sensor. Similar conditions hold for a Wide AF mechanism. From $Z_{switch}+\Delta$Zoom to $Z_{max}$ only the Tele sensor is operational, hence, power is supplied only to this sensor. Similarly, only the Tele sensor is operational and power is supplied only to it for a Tele AF mechanism. Another option is that the Tele sensor is operational and the Wide sensor is working in low frame rate. From $Z_{switch}$ to $Z_{switch}+\Delta$Zoom, both sensors are operational.

Zoom-in: at low ZF up to slightly above ZFT, the output image is the digitally zoomed, unchanged Wide camera output. For the up-transfer ZF, the output is a transformed Tele sub-camera output, where the transformation is performed by a global registration (GR) algorithm to achieve smooth transition. For higher (than the up-transfer), the output is the transfer ZF output digitally zoomed.

Zoom-out: at high ZF down to slightly below ZFT, the output image is the digitally zoomed transformed Tele camera output. For the down-transfer ZF, the output is a shifted Wide camera output, where the Wide shift correction is performed by the GR algorithm to achieve smooth transition, i.e. with no jump in the ROI region. For lower (than the down-transfer) ZF, the output is basically the down-transfer ZF output digitally zoomed but with gradually smaller Wide shift correction, until for ZF=1 the output is the unchanged Wide camera output.

Figure 6:
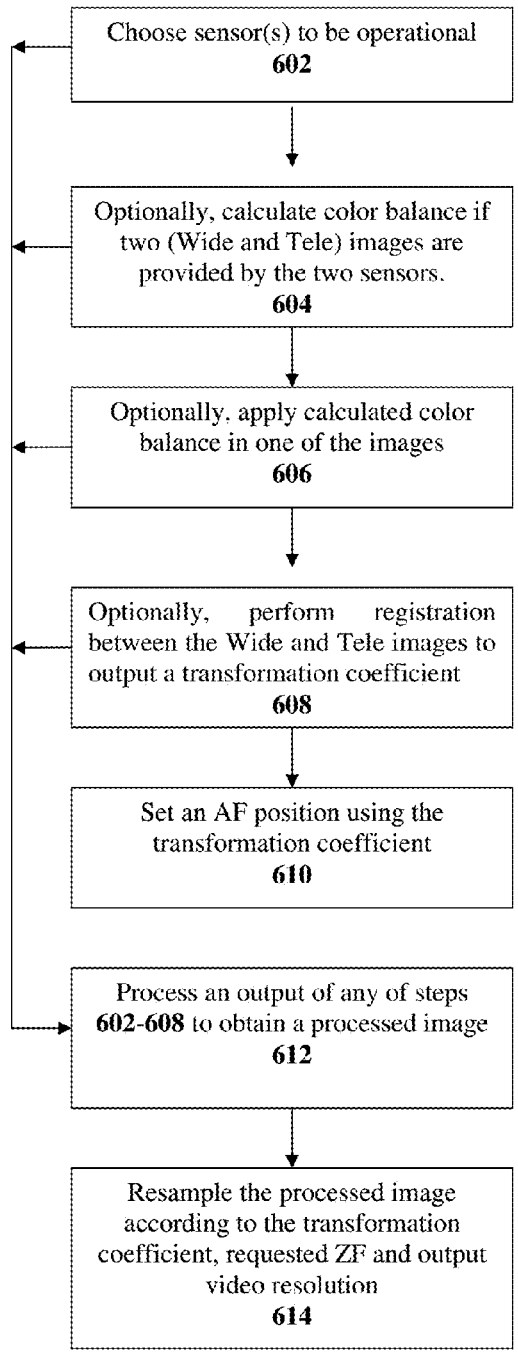
FIG. 6 shows an embodiment of a method disclosed herein for acquiring a zoom image in video/preview mode.
Figure 7:
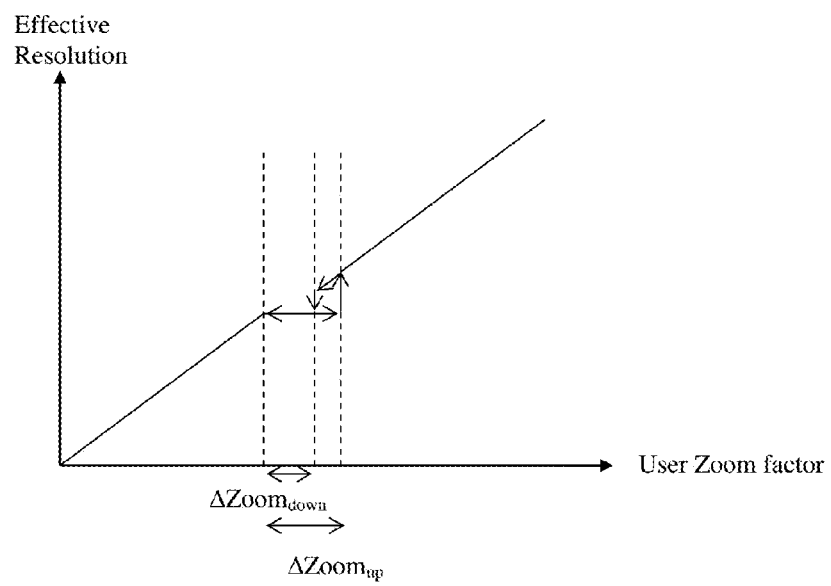
FIG. 7 shows a graph illustrating an effective resolution zoom factor.

FIG. 6 shows an embodiment of a method disclosed herein for acquiring a zoom image in video/preview mode for 3 different zoom factor (ZF) ranges: (a) ZF range=1:$Z_{switch}$; (b) ZF range=$Z_{switch}$:$Z_{switch}+\Delta$Zoom$_{in}$; and (c) Zoom factor range=$Z_{switch}+\Delta$Zoom$_{in}$:$Z_{max}$. The description is with reference to a graph of effective resolution vs. zoom value (FIG. 7). In step 602, sensor control module 116 chooses (directs) the sensor (Wide, Tele or both) to be operational. Specifically, if the ZF range=1:$Z_{switch}$, module 116 directs the Wide sensor to be operational and the Tele sensor to be non-operational. If the ZF range is $Z_{switch}$:$Z_{switch}+\Delta$Zoom$_{in}$, module 116 directs both sensors to be operational and the zoom image is generated from the Wide sensor. If the ZF range is $Z_{switch}+\Delta$Zoom$_{in}$:$Z_{max}$, module 116 directs the Wide sensor to be non-operational and the Tele sensor to be operational. After the sensor choice in step 602, all following actions are performed in video processing core 126. Optionally, in step 604, color balance is calculated if two images are provided by the two sensors. Optionally yet, in step 606, the calculated color balance is applied in one of the images (depending on the zoom factor). Further optionally, in step 608, registration is performed between the Wide and Tele images to output a transformation coefficient. The transformation coefficient can be used to set an AF position in step 610. In step 612, an output of any of steps 602-608 is applied on one of the images (depending on the zoom factor) for image signal processing that may include denoising, demosaicing, sharpening, scaling, etc. In step 614, the processed image is resampled according to the transformation coefficient, the requested ZF (obtained from zoom function 124) and the output video resolution (for example 1080 p). To avoid a transition point to be executed at the same ZF, $\Delta$Zoom can change while zooming in and while zooming out. This will result in hysteresis in the sensor switching point.

In more detail, for ZF range 1:$Z_{switch}$, for ZF<$Z_{switch}$, the Wide image data is transferred to the ISP in step 612 and resampled in step 614. For ZF range=$Z_{switch}$:$Z_{switch}$+$\Delta$Zoom$_{in}$, both sensors are operational and the zoom image is generated from the Wide sensor. The color balance is calculated for both images according to a given ROI. In addition, for a given ROI, registration is performed between the Wide and Tele images to output a transformation coefficient. The transformation coefficient is used to set an AF position. The transformation coefficient includes the translation between matching points in the two images. This translation can be measured in a number of pixels. Different translations will result in a different number of pixel movements between matching points in the images. This movement can be translated into depth and the depth can be translated into an AF position. This enables to set the AF position by only analyzing two images (Wide & Tele). The result is fast focusing.

Both color balance ratios and transformation coefficient are used in the ISP step. In parallel, the Wide image is processed to provide a processed image, followed by resampling. For ZF range=$Z_{switch}+\Delta$Zoom$_{in}$:$Z_{max}$ and for Zoom factor>$Z_{switch}$, +$\Delta$Zoom$_{in}$, the color balance calculated previously is now applied on the Tele image. The Tele image data is transferred to the ISP in step 612 and resampled in step 614. To eliminate crossover artifacts and to enable smooth transition to the Tele image, the processed Tele image is resampled according to the transformation coefficient, the requested ZF (obtained from zoom function 124) and the output video resolution (for example 1080 p).

FIG. 7 shows the effective resolution as a function of the zoom factor for a zoom-in case and for a a zoom-out case $\Delta$Zoom$_{up}$ is set when we zoom in, and $\Delta$Zoom$_{down}$ is set when we zoom out. Setting $\Delta$Zoom$_{up}$ to be different from $\Delta$Zoom$_{down}$ will result in transition between the sensors to be performed at different zoom factor ("hysteresis") when zoom-in is used and when zoom-out is used. This hysteresis phenomenon in the video mode results in smooth continuous zoom experience.

Optical Design

Figure 8:
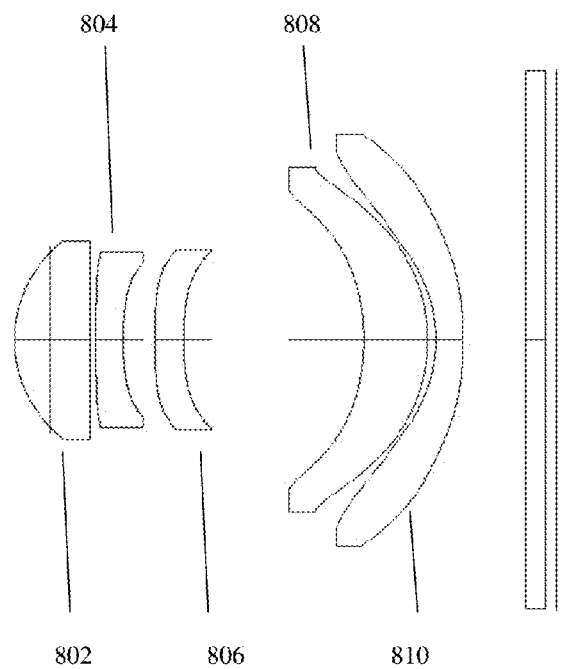
FIG. 8 shows one embodiment of a lens block in a thin camera disclosed herein.

Additional optical design considerations were taken into account to enable reaching optical zoom resolution using small total track length (TTL). These considerations refer to the Tele lens. In an embodiment, the camera is "thin" (see also FIG. 1B) in the sense that is has an optical path of less than 9 mm and a thickness/focal length (FP) ratio smaller than about 0.85. Exemplarily, as shown in FIG. 8, such a thin camera has a lens block that includes (along an optical axis starting from an object) five lenses: a first lens element 802 with positive power and two lenses 804 and 806 and with negative power, a fourth lens 808 with positive power and a fifth lens 810 with negative power. In the embodiment of FIG. 8, the EFL is 7 mm, the TTL is 4.7 mm, f=6.12 and FOV=20°. Thus the Tele lens TTL/EFL ratio is smaller than 0.9. In other embodiments, the Tele lens TTL/EFL ratio may be smaller than 1.

Figure 9:
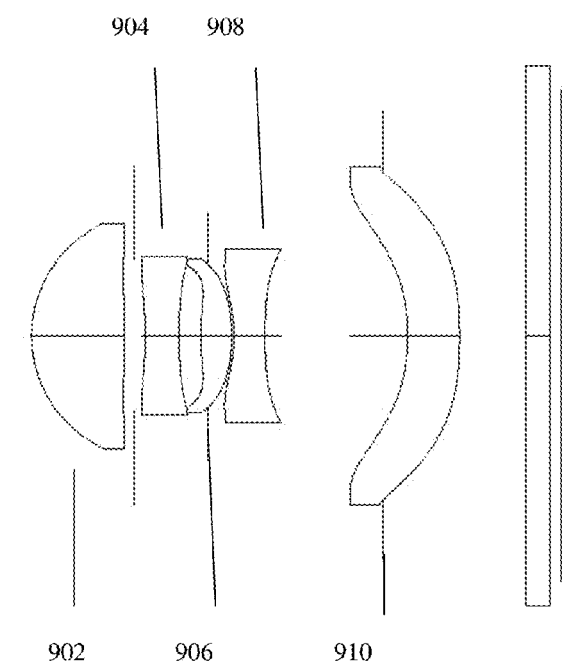
FIG. 9 shows another embodiment of a lens block in a thin camera disclosed herein.

In another embodiment of a lens block in a thin camera, shown in FIG. 9, the camera has a lens block that includes (along an optical axis starting from an object) a first lens element 902 with positive power a second lens element 904 with negative power, a third lens element with positive power 906 and a fourth lens element with negative power 908, and a fifth lens element 910 with positive or negative power. In this embodiment, f=7.14, F#=3.5, TTL=5.8 mm and FOV=22.7°.

In conclusion, dual aperture optical zoom digital cameras and associate methods disclosed herein reduce the amount of processing resources, lower frame rate requirements, reduce power consumption, remove parallax artifacts and provide continuous focus (or provide loss of focus) when changing from Wide to Tele in video mode. They provide a dramatic reduction of the disparity range and avoid false registration in capture mode. They reduce image intensity differences and enable work with a single sensor bandwidth instead of two, as in known cameras.

All patent applications mentioned in this specification are herein incorporated in their entirety by reference into the specification, to the same extent as if each individual patent application was specifically and individually indicated to be incorporated herein by reference. In addition, citation or identification of any reference in this application shall not be construed as an admission that such reference is available as prior art to the present disclosure.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A zoom digital camera comprising:
a) a first imaging section that includes a fixed focal length first lens with a first field of view ($FOV_1$) and a first image sensor, the first imaging section operative to provide first image data of an object or scene;
b) a second imaging section that includes a fixed focal length second lens with a second FOV ($FOV_2$) that is narrower than $FOV_1$ and a second image sensor, the second imaging section operative to provide second image data of the object or scene; and
c) a camera controller operatively coupled to the first and second imaging sections, the camera controller configured to provide an output image having a focused subject, wherein the output image exhibits a shallow depth of focus (DOF) effect in which objects in front of or behind the focused subject appear blurry, wherein the focused subject is provided by the second lens and wherein the objects behind the focused subject appear blurry due to the first lens being focused to a closer distance than the subject.

2. The zoom digital camera of claim 1, wherein the output image is a still mode output image.

3. The zoom digital camera of claim 1, wherein, for a portrait photo, the output image exhibiting a shallow DOF effect is similar to a portrait photo taken with a digital single-lens reflex (DSLR) camera.

4. The zoom digital camera of claim 3, wherein the DSLR has a focal length between 50-80 mm.

5. A zoom digital camera comprising:
a) a first imaging section that includes a fixed focal length first lens with a first field of view ($FOV_1$) and a first image sensor; and
b) a second imaging section that includes a fixed focal length second lens with a second FOV (FOV2) that is narrower than FOV, and a second image sensor, wherein the second lens includes five lens elements along an optical axis starting from an object starting with a first lens element with positive power, wherein the five lens elements further include a second lens element with negative power, a fourth lens element with negative power and a fifth lens element, wherein a largest distance between consecutive lens elements along the optical axis is a distance between the fourth lens element and the fifth lens element, and wherein a ratio of a total track length (TTL) to effective focal length (EFL) of the second lens is smaller than 1.

6. The zoom digital camera of claim 5, further comprising a camera controller operatively coupled to the first and second imaging sections, the camera controller configured to provide video output images with a smooth transition when switching between a lower zoom factor (ZF) value and a higher ZF value or vice versa.

7. A zoom digital camera comprising:
a) a first imaging section that includes a fixed focal length first lens with a first field of view ($FOV_1$) and a first image sensor, the first imaging section operative to provide first image data of an object or scene;
b) a second imaging section that includes a fixed focal length second lens with a second FOV ($FOV_2$) that is narrower than $FOV_1$ and a second image sensor, the second imaging section operative to provide second image data of the object or scene; and
c) a camera controller operatively coupled to the first and second imaging sections, the camera controller configured to provide an output image having a focused subject, wherein the output image exhibits a shallow depth of focus (DOF) effect in which objects in front of or behind the focused subject appear blurry, wherein the shallow DOF effect is achieved by focusing the first lens on a distance closer than the subject to thereby obtain the first image data comprising out-of-focus blurred background image data, and focusing the second lens on the subject to obtain the second image data; and fusing the first image data with the second image data to increase blurriness of background of the output image.

* * * * *

(12) INTER PARTES REVIEW CERTIFICATE (3554th)
United States Patent
Shabtay et al.

(10) Number: US 10,015,408 K1
(45) Certificate Issued: Apr. 9, 2024

(54) DUAL APERTURE ZOOM DIGITAL CAMERA

(71) Applicants: Gal Shabtay; Ephraim Goldenberg; Oded Gigushinski; Noy Cohen

(72) Inventors: Gal Shabtay; Ephraim Goldenberg; Oded Gigushinski; Noy Cohen

(73) Assignee: COREPHOTONICS LTD.

Trial Number:

IPR2020-00489 filed Feb. 5, 2020

Inter Partes Review Certificate for:

Patent No.: 10,015,408
Issued: Jul. 3, 2018
Appl. No.: 15/424,853
Filed: Feb. 5, 2017

The results of IPR2020-00489 are reflected in this inter partes review certificate under 35 U.S.C. 318(b).

INTER PARTES REVIEW CERTIFICATE
U.S. Patent 10,015,408 K1
Trial No. IPR2020-00489
Certificate Issued Apr. 9, 2024

AS A RESULT OF THE INTER PARTES REVIEW PROCEEDING, IT HAS BEEN DETERMINED THAT:

Claims 5 and 6 are found patentable.

\* \* \* \* \*